United States Patent
Moeller et al.

(10) Patent No.: US 9,939,021 B2
(45) Date of Patent: Apr. 10, 2018

(54) BEARING WITH MINIMIZED LEAKAGE OF LUBRICANT

(71) Applicant: SIEMENS AKTIENGESELLSCHAFT, München (DE)

(72) Inventors: Troels Kildemoes Moeller, Hurup Thy (DK); Thyge Skovbjerg Thomsen, Herning (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 15/133,297

(22) Filed: Apr. 20, 2016

(65) Prior Publication Data

US 2016/0312832 A1    Oct. 27, 2016

(30) Foreign Application Priority Data

Apr. 21, 2015    (EP) .................................... 15164441

(51) Int. Cl.
    *F16C 33/66*    (2006.01)
    *F16C 37/00*    (2006.01)
    (Continued)

(52) U.S. Cl.
    CPC .......... *F16C 33/6607* (2013.01); *F03D 80/70* (2016.05); *F16C 19/52* (2013.01);
    (Continued)

(58) Field of Classification Search
    CPC .... F16C 19/52; F16C 33/6607; F16C 33/726; F16C 2300/31; F16C 2360/31;
    (Continued)

(56) References Cited

U.S. PATENT DOCUMENTS 3,494,673 A    2/1970    Wilcox
3,785,196 A *    1/1974    Smith .................... G01N 33/30
                                                       73/10
(Continued)

FOREIGN PATENT DOCUMENTS

CN    202091374 U    12/2011
CN    202157809 U    3/2012
(Continued)

OTHER PUBLICATIONS

Chinese language Chinese Office Action for Application No. 2016102496829, dated Nov. 1, 2017.

*Primary Examiner* — Marcus Charles
(74) *Attorney, Agent, or Firm* — Schmeiser Olsen & Watts LLP

(57)    ABSTRACT

A bearing of a wind turbine, wherein the bearing is lubricated with a lubricant for reducing wear and fatigue of the bearing, the bearing is sealed such that the amount of lubricant which is leaking out of the bearing is minimized, is provided. The bearing includes a ventilation device with at least one pressure compensation hole for enabling a pressure compensation between the sealed bearing and the ambient. The ventilation device further includes a compressor unit, which is connected with the pressure compensation hole. Thus, a compressed medium can be selectively blown through the pressure compensation hole to ensure that the pressure compensation hole remains substantially unobstructed such that overpressure within the bearing compared to the ambient is minimized and leakage of lubricant out of the bearing is reduced. A wind turbine including such bearing and an associated method is also provided.

13 Claims, 2 Drawing Sheets

(51) Int. Cl.
  *F16C 33/72* (2006.01)
  *F16C 19/52* (2006.01)
  *F03D 80/70* (2016.01)

(52) U.S. Cl.
  CPC .......... *F16C 33/726* (2013.01); *F16C 37/007* (2013.01); *F05B 2260/64* (2013.01); *F16C 2300/14* (2013.01); *F16C 2360/31* (2013.01); *Y02E 10/722* (2013.01)

(58) Field of Classification Search
  CPC .. F16C 33/6685; F16C 33/766; F16C 37/007; F03D 80/70; F05B 2260/64; Y02E 10/722
  USPC ..... 384/14–15, 462, 471, 473–475; 415/112, 415/168.1, 170.1; 184/4, 6.11; 616/61, 616/91–92, 174; 416/61, 91–92, 174
  See application file for complete search history.

(56) References Cited

U.S. PATENT DOCUMENTS

| | | | |
|---|---|---|---|
| 3,833,277 A | | 9/1974 | Jones et al. |
| 5,001,435 A | * | 3/1991 | Smith ............... F16C 19/52 324/671 |
| 5,184,505 A | * | 2/1993 | van den Berg ........ G01N 33/30 73/10 |
| 6,324,899 B1 | * | 12/2001 | Discenzo ............... F16C 19/52 340/631 |
| 6,991,378 B2 | | 1/2006 | Jacquemont et al. |
| 7,077,630 B2 | * | 7/2006 | Wobben ................ F03D 1/0658 416/155 |
| 7,690,246 B1 | * | 4/2010 | Discenzo ............... F16C 19/52 184/108 |
| 8,366,390 B2 | * | 2/2013 | Tiscareno ............... F16C 19/08 384/473 |
| 2014/0117743 A1 | * | 5/2014 | Vogler ................. B60K 7/0007 301/6.5 |
| 2015/0010255 A1 | * | 1/2015 | Ishida .................. F16C 33/726 384/476 |

FOREIGN PATENT DOCUMENTS

| | | |
|---|---|---|
| CN | 203044505 U | 7/2013 |
| CN | 203516473 U | 4/2014 |
| EP | 2325486 A1 | 5/2011 |
| JP | H0725239 U | 5/1995 |
| JP | 2006284496 A | 10/2006 |

* cited by examiner

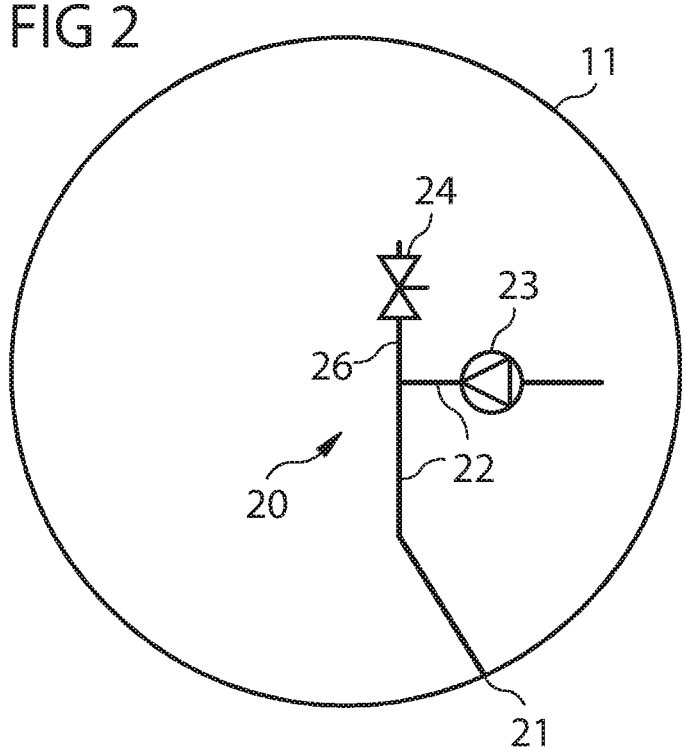

BEARING WITH MINIMIZED LEAKAGE OF LUBRICANT

CROSS-REFERENCE TO RELATED APPLICATIONS

This application claims priority to European Application No. EP 15164441.6, having a filing date of Apr. 21, 2015, the entire contents of which are hereby incorporated by reference.

FIELD OF TECHNOLOGY

The following relates to a bearing of a wind turbine, wherein the bearing comprises a ventilation device. Furthermore, the invention relates to a wind turbine with such a bearing and to a method of reducing leakage of lubricant out of such a bearing.

BACKGROUND

The leakage of lubricant out of a bearing is advantageously kept as low as possible in order to ensure that a desired amount of lubricant remains within the bearing. If uncontrolled leakage occurs, the level of lubricant within the bearing could become low. If a bearing is operated at low level of lubricant, detrimental damages may be the consequence for the bearing due to wear and fatigue.

In addition, an elevated rate of leakage of lubricant may lead to additional service costs due to increased service activities of cleaning and filling up the lubricant containers at the wind turbine. In particular, leakage of lubricant on offshore wind turbines may lead to significantly elevated service costs.

Typically, bearings of a wind turbine are sealed such that the amount of lubricant which is leaking out on a regular basis is minimized. Ideally, no or only very little lubricant leaks out of the sealed bearing of the wind turbine. In practice, it may occur, though, that elevated amounts of lubricant may leak out of the bearing. This is attributed at least partially to an overpressure inside the bearing compared to the pressure of the surrounding ambient. Overpressure inside the bearing may be caused by an elevated temperature inside the bearing compared to the ambient. To give an example, if the temperature of a bearing with a bearing diameter of four meters rises from 15 degrees Celsius to 55 degrees Celsius, the pressure inside the bearing might increase by 0.14 bar. In order to reduce the over pressure of inside the bearing compared to the pressure of the ambient, approximately eight liters of air needs to be released from the bearing.

It has been shown that even a relatively small overpressure inside the bearing, e.g. 0.1 bar, may over time lead to significant leakage. This may be the case by slowly pressing the lubricant below the seal lip of such a sealed bearing. Elevated overpressure inside the bearing, e.g. 0.2 bar or higher, may even lead to a significant leakage of lubricant in relatively short time.

In the state of the art, this leakage of lubricant has typically been accepted. In order to minimize the amount of leakage, the overpressure inside the bearing has been tried to minimize.

Thus, there exists the desire of providing an improved concept of reducing the leakage of lubricant out of a bearing of a wind turbine.

SUMMARY

As aspect relates to a bearing of a wind turbine, wherein the bearing is lubricated with a lubricant for reducing wear and fatigue of the bearing. Furthermore, the bearing is sealed such that the amount of lubricant which is leaking out of the bearing is minimized. The bearing comprises a ventilation device with at least one pressure compensation hole for enabling a pressure compensation between the sealed bearing and the ambient. Furthermore, the ventilation device comprises a compressor unit, which is connected with a pressure compensation hole such that a compressed medium can be selectively blown through the pressure compensation hole to ensure that the pressure compensation hole remains substantially unobstructed. Thus, overpressure within the bearing compared to the ambient is minimized which leads to a reduction of leakage of lubricant out of the bearing.

A key aspect of the present embodiment of the invention is that a compressor unit is added to a conventional bearing with a pressure compensation hole. The aim and objective of the compressor unit is to ensure that the pressure compensation hole is not partially or completely blocked by lubricant. In other words, the compressor unit ensures that the pressure compensation hole continuously and reliably is able to fulfill its purpose of providing a way that the pressure inside the bearing and the pressure outside the bearing equalizes. Thus, the risk of even small overpressure inside the bearing is minimized. As overpressure inside the bearing is one of the main causes of leakage of lubricant out of the bearing, a reliably working mechanism to avoid overpressure inside the bearing leads to improved, i.e. reduced, leakage rates of lubricant.

The advantage of a bearing with such a ventilation device is at least two-fold: First, it involves a significant reduction of lubricant leakage rates which leads to an improved bearing safety and less service costs for cleaning and maintenance of the bearing. Second, a bearing with such a ventilation device for reducing the over-pressure within the bearing also provides a reduced wear of the seal. This prolongs the lifetime of the seals which also leads to an improved bearing safety and less service costs for cleaning and maintenance of the bearing.

Note that one could also simply provide a pressure compensation hole at the bearing without a ventilation mechanism. The pressure compensation hole provides a connection and a possibility to compensate and equalize the pressure within the bearing and the pressure in the ambient around the bearing. One drawback of this solution is, however, that the pressure compensation hole may be blocked or obstructed by grease. This is quite common because the lubricant of inside the bearing may easily enter the pressure compensation hole and solidify therein. Once the pressure compensation hole is partially or completely obstructed, the ability and efficiency for equalizing the pressure within the bearing and the ambient around the bearing is reduced. An advantage of simply providing a pressure compensation hole without any compressor unit for selectively blowing a compressed medium through the pressure compensation hole is that the concept is considerably less complex and less expensive.

Turning back to the ventilation device with the compressor unit, the compressor unit is arranged and configured such that it can selectively blow a compressed medium into the pressure compensation hole. In the case that the pressure compensation hole is blocked by lubricant, in particular by solidified lubricant, the compressed medium which is blown from the outside into the pressure compensation hole transfers the blocking lubricant into the inside of the bearing. After cleaning of the pressure compensation hole, the pressure compensation hole is enabled again to work as pressure equalizing means.

The compressor unit may for example be a small air compressor. It is not desired to continuously blow air from the outside into the inside of the bearing, as this might even lead to a situation of undesired overpressure inside the bearing. Instead, the compressor unit shall be able to provide a relatively short pulse of compressed air which is able to free the eventually blocked pressure compensation hole.

As another example, the compressor unit may comprise a recipient, such as a tank, which is at least partially filled by the compressed medium. The recipient may be filled or exchanged during service of the wind turbine.

The refillable or exchangeable tank has the advantage of avoiding a more complex compressor.

The compressor has the advantage that it does not have to been serviced on a regular basis, but is able to work fully autonomously.

Another option is the combination of a compressor and a recipient with already compressed air in order to build up an increased pressure for blowing into the pressure compensation hole. This has the advantage that a more sudden burst of air can be achieved for cleaning the potentially blocked pressure compensation hole.

A lubricant is a substance introduced inside the bearing to reduce friction between the surfaces of the bearing which are in mutual contact with each other. An example of a lubricant is grease, which is a semisolid lubricant. Grease generally is made of a soap emulsified with mineral or vegetable oil.

The bearing may comprise one single pressure compensation hole or it may comprise a plurality of pressure compensation holes. In the latter case it is advantageous to connect all pressure compensation holes to one or several compressor units.

If the compressor unit is not arranged in direct vicinity to the pressure compensation hole, it is advantageous to connect the compressor unit with the pressure compensation hole by means of flexible hoses and/or stiff pipes.

The inventive concept can in principle be applied to any bearing of the wind turbine. It is particularly advantageous to apply this concept to the main bearing of the wind turbine.

The main bearing of the wind turbine is understood as being the bearing for supporting the rotor of the wind turbine. As industrial wind turbines become larger and larger, the main bearing also increases in size. Exemplarily, a direct drive wind turbine with a rated power of six to seven Megawatt may comprise a main bearing which has a diameter of several meters. From a structural point of view, construction and provision of such a large bearing may pose significant challenges. For such a large bearing, a considerable amount of lubricant may be needed in order to ensure operation of the bearing with minimum wear and fatigue. As a considerable amount of lubricant exists inside the bearing, the potential risk of a considerable amount of lubricant leaking out of the bearing exists. Thus, it is particularly advantageous to apply the described concept of reducing the amount of leaking lubricant to the main bearing of a wind turbine.

Note that a wind turbine may also comprise more than one main bearing. Due to the increasing size of wind turbines and the increasing forces acting on the main bearing, two or even more than two main bearings may be an attractive solution. In the case that a wind turbine comprises more than one main bearing, one, several or all main bearings may be configured as a bearing with a ventilation device according to embodiments of the present invention.

The bearing may in principle be any type of bearing. Exemplarily, the bearing is a rolling-element bearing comprising a plurality of rolling elements between at least two races.

Rolling-element bearings have the advantage of a good tradeoff between cost, size, weight, carrying capacity, durability, accuracy an friction. Furthermore, rolling-element bearings represent a well proven technology. In particular in context of main bearings of wind turbines, rolling-element bearings are well established. Examples of rolling-element bearings are ball bearings or tapered roller bearings.

Another concrete example for a bearing which is suitable to be equipped with the inventive ventilation device is a sealed journal bearing as such a bearing also implies a volume which is at least partially filled with a lubricant.

In an advantageous embodiment of the invention, the compressed medium substantially consists of nitrogen and oxygen.

In other words, the compressed medium substantially consist of compressed air. An advantage of using air for blowing into the pressure compensation hole is that it is available and harmless to the components which are used inside the bearing. Alternatively, also other gases such as inert gas may possibly be blown into the pressure compensation hole.

In another advantageous embodiment, the time span during which the compressed medium is blown into the pressure compensation hole is kept small, which means that it is shorter than ten seconds, in particular shorter than five seconds.

A short time span of blowing the compressed medium into the pressure compensation hole is advantageous because the pressure compensation hole is thus able to serve as a means for equalizing the pressures during most of the time and only allows short time for cleaning the pressure compensation hole.

Also note that it is advantageous to blow only a small amount of compressed medium into the pressure compensation hole. To give an example, the amount of pressurized air may be in the range of 0.5 liters during a short time of e.g. 2 seconds.

In any case, the amount of pressurized air and the time span during which the air is blown into the pressure compensation hole has to be chosen such that it is sufficient to de-block the pressure compensation hole. However, the amount of pressurized air shall be kept as low as possible to prevent overpressure inside the bearing. As soon as the cleaning sequence is over and the pressure compensation hole is free, eventual overpressure which may have existed before the cleaning sequence and/or due to the cleaning sequence, i.e. due to the injection of compressed air into the bearing, may then be released via the pressure compensation hole.

In another advantageous embodiment, the ventilation device further comprises a pressure transducer for monitoring the pressure within the bearing.

The pressure may be monitored intermittently by the pressure transducer.

Advantageously, the pressure is monitored continuously. The pressure transducer may be located at a different spot relative to the pressure compensation hole, assuming that the pressure inside the bearing is substantially equal at any circumferential position of the bearing.

In another advantageous embodiment, the ventilation device further comprises a two-way valve which is arranged such that the valve is closed during cleaning of the pressure compensation hole such that a maximum pressure can be applied to the at least partially obstructed pressure compensation hole; and the valve is open during an inactive state of the compressor unit such that a maximum pressure compensation between the sealed bearing and the ambient can be achieved.

Particularly, the two-way valve, which is an example of a directional control vane, may be activated hydraulically, electrically or pneumatically. This ensures the possibility of a remote and/or automatic control of the ventilation device. A remote control and a remote activation of the cleaning sequence is highly advantageous, and may even be necessary, at offshore wind turbines.

In the embodiment comprising the two-way valve, the two-way valve is advantageously arranged at a position between the compressor unit and the pressure compensation hole where it is not in direct connection between the compressor unit and the pressure compensation hole. The two-way valve may for example be located in a depressurization means which is diverting from the connection means connecting the compressor unit and the pressure compensation hole. The depressurization means has the purpose of letting the overpressure flow out of the bearing in a controlled manner. The two-way valve is closed during activation of the compressor unit, i.e. during blowing air into the pressure compensation hole in order to clean it. However, the two-way valve is open during the remaining time as during this time the depressurization means needs to be open in order to ensure a free flow of air from the bearing into the ambient.

Embodiments of the invention are also directed towards a wind turbine for generating electricity, wherein the main bearing, which is destined to support the rotor of the wind turbine, comprises a bearing with a ventilation device as described above.

A wind turbine is a device which converts kinetic energy from the wind into a rotational movement of the rotor. This rotational movement is subsequently used to generate electricity.

Exemplarily, the bearing comprises a stationary inner bearing ring and a rotating outer bearing ring. In this case, it has been proven advantageous to rotate the pressure compensation hole in the bottom part of the stationary inner bearing ring.

Alternatively, the bearing may comprise a stationary outer bearing ring and a rotating inner bearing ring. In this case, it is advantageous to place the pressure compensation hole in the top part of the outer bearing ring.

Embodiments of the invention are also directed towards a method of reducing leakage of lubricant out of a bearing of a wind turbine, wherein the method comprises the steps of selectively blowing a compressed medium through a pressure compensation hole of the bearing for ensuring that the pressure compensation hole remains substantially unobstructed; and minimizing overpressure within the bearing compared to the ambient by enabling a pressure compensation between the sealed bearing and the ambient via the pressure compensation hole.

A key aspect of the method is that the pressure compensation hole is selectively cleaned from partial or complete obstruction by e.g. the lubricant. Thus, it is ensured that the pressure compensation hole remains open and is able to ensure a pressure compensation during substantially the whole operation time of the wind turbine.

As an example, every thirty minutes air is blown through the pressure compensation hole during two seconds in order to ensure that the pressure compensation hole remains substantially unobstructed.

Note that this method is advantageously carried out automatically and is thus well suited for a wind turbine at a site which is difficult to access.

In another advantageous embodiment, the method comprises the further step of deliberately building up overpressure within the bearing by means of the compressor unit such that discharge of used lubricant from inside the bearing into the ambient via at least one lubricant drain hole is facilitated.

In other words, this further step allows the used lubricant escape from inside the bearing more easily. Note that, ideally, overpressure within the bearing is kept small or even avoided at all by the inventive method. Thus, gravity forces may not be enough to ensure an efficient and reliable discharge of the used lubricant. Note that in conventional bearings of a wind turbine with no efficient ventilation system, the existing overpressure inside the bearing facilitates pressing the used lubricant out of the bearing. As the overpressure inside the bearing is reduced or even avoided at all with the inventive system, the escape of used lubricant via the one or more lubricant drain holes is in general more difficult. Thus, by selectively and deliberately building up a controlled overpressure of e.g. 0.1 bar, the used lubricant may be blown out of the bearing via the one or more lubricant drain holes more easily. Due to the fact that the overpressure is limited and the duration is very short, e.g. fifteen to twenty seconds, it does not hurt the seals and does not lead to leakage.

The further step of deliberately building up overpressure during a very short time may be repeated a few times a day, such as e.g. four times per day.

In the case of a stationary inner bearing ring and a rotational outer bearing ring, the lubricant drain hole is advantageously located at the top of the inner bearing ring. Thus, the lubricant is supported by gravity when flowing or falling downwards through the lubricant drain hole towards a lubricant collection container for collecting used lubricant.

Note that specific embodiments and details which have been described in relation to the bearing also applies to the wind turbine and to the method of reducing leakage of a bearing of a wind turbine as well.

BRIEF DESCRIPTION

Some of the embodiments will be described in detail, with reference to the following figures, wherein like designations denote like members, wherein:

FIG. 2 shows a schematic view of an embodiment of a ventilation device.

DETAILED DESCRIPTION

Figure 1A:
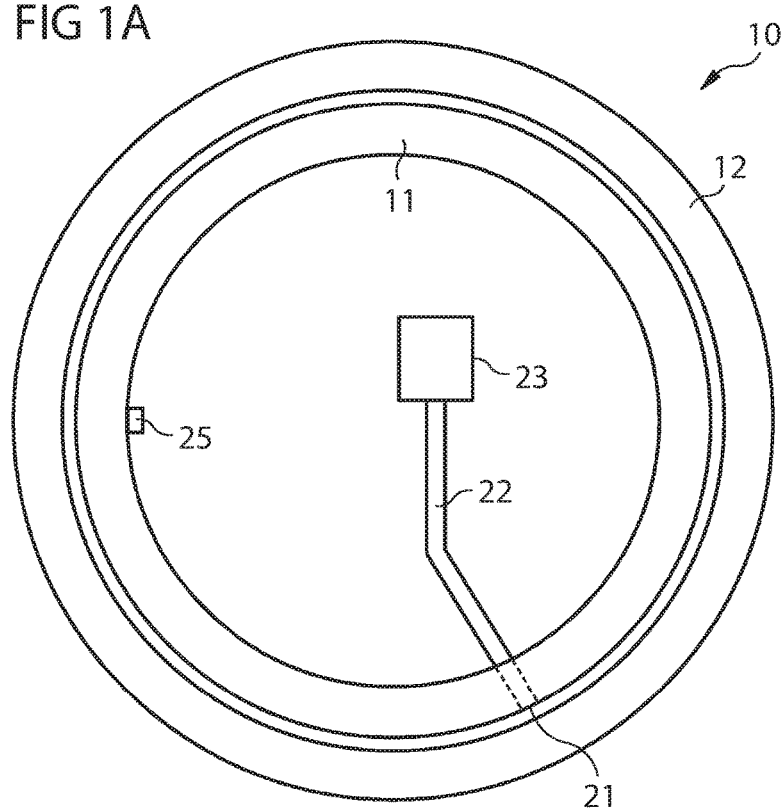
FIG. 1A shows an embodiment of a bearing of a wind turbine with a ventilation device.
Figure 1B:
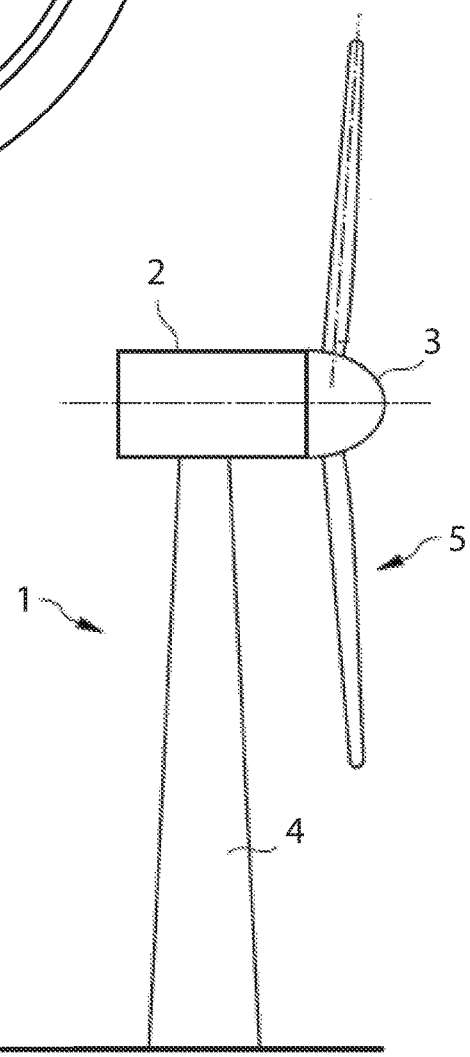
FIG. 1B shows an embodiment of a wind turbine.

FIG. 1A shows a bearing 10 of a wind turbine 1 (not depicted), wherein the bearing 10 comprises an inner bearing ring 11 and an outer bearing ring 12. FIG. 1B depicts the wind turbine 1 according to an embodiment. In the example as illustrated in FIG. 1A, the inner bearing ring 11 is stationary and the outer bearing ring 12 is rotatable. Referring now to both FIGS. 1A and 1B, this has to be understood that the inner bearing ring 11 is stationary relative to the nacelle 2 and the tower 4 of the wind turbine 1, while the outer bearing ring 12 is rotatable relative to the nacelle 2 of the wind turbine 1. Relative to the hub 3 and the rotor blades 5 of the wind turbine 1, the outer bearing ring 12 is stationary and the inner bearing ring 11 is rotatable. The inner bearing ring 11 and the outer bearing ring 12 both have an annular shape and are arranged in a co-axial manner in the example of FIG. 1A. The bearing may for example be a roller bearing such as a three-roller bearing or a double-tapered bearing.

The inner bearing ring 11 comprises a pressure compensation hole 21. The pressure compensation hole is a structural feature being attributed of the inner bearing ring 11. The purpose of the pressure compensation hole 21 is to enable a pressure compensation between the pressure inside the bearing 10 and the ambient. The pressure compensation hole 21 is directly connected with a connection means 22, e.g. a flexible hose. At the opposite end of the connection means 22, i.e. opposite to the pressure compensation hole 21, a compressor unit 23 is arranged. The compressor unit 23 is a small air compressor for providing a pulse of compressed air during a pulse length of a few seconds. The compressor unit 23 is configured by a controller which activates and deactivates the compressor. The ventilation device 20 furthermore comprises a pressure transducer 25. The pressure transducer is arranged at the inner bearing ring 11 and is able to continuously monitor the pressure inside the bearing 10. The pressure transducer 25 may in particular be able to transmit the determined pressure values in a wireless manner to a controller unit where these pressure values are further processed.

FIG. 2 shows a schematic view of an embodiment of a ventilation device 20. In this embodiment, a depressurization means 26 is diverting from the connection means 22 for guiding the over-pressurized air from inside the bearing into the ambient in a controlled manner. A two-way valve 24 which can be activated electrically is located at the depressurization means 26. If the compressor unit 23 is activated, i.e. pressurized air is blown into the pressure compensation hole 21, the two-way valve 24 is closed. This ensures an efficient and powerful pressure pulse through the pressure compensation hole 21. After the cleaning sequence, i.e. after deactivation of the compressor unit 23, the two-way valve 24 is opened such that air from inside the bearing can flow through the connection means 22 and subsequently through the depressurization means 26 into the ambient. This ultimately leads to a reduction of lubricant leakage out of the bearing.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bearing for use with a wind turbine, wherein the bearing is lubricated with a lubricant for reducing wear and fatigue of the bearing, the bearing being sealed such that an amount of the lubricant which is leaking out of the bearing is minimized, the bearing comprising:
    a ventilation assembly with at least one pressure compensation hole for enabling a pressure compensation between the bearing and the ambient, the ventilation assembly arranged inside the bearing;
    wherein the ventilation assembly comprises a compressor unit, which is connected with the at least one pressure compensation hole such that a compressed medium can be selectively blown through the at least one pressure compensation hole to remove an amount of lubricant obstructing the at least one pressure compensation hole and ensure that the at least one pressure compensation hole remains substantially unobstructed, allowing air within the bearing to exit through the at least one pressure compensation hole to minimize an overpressure within the bearing compared to the ambient and reduce leakage of the lubricant out of the bearing.

2. The bearing according to claim 1, wherein the bearing is a main bearing of the wind turbine suitable for supporting a rotor of the wind turbine.

3. The bearing according to claim 1, wherein the bearing is a rolling-element bearing comprising a plurality of rolling elements between at least two races.

4. The bearing according to claim 1, wherein the compressed medium substantially consists of nitrogen and oxygen.

5. The bearing according to claim 1, wherein the compressor unit is connected with the at least one pressure compensation hole via a flexible hose and/or a stiff pipe.

6. The bearing according to claim 1, wherein the compressor unit blows the compressed medium through the at least one pressure compensation hole during a time span which is shorter than ten seconds.

7. The bearing according to claim 6, wherein the time span is shorter than five seconds.

8. The bearing according claim 1, wherein the ventilation device further comprises a two-way valve which is arranged such that:
    the two-way valve is closed during cleaning of the at least one pressure compensation hole such that a maximum pressure can be applied to the at least partially obstructed pressure compensation hole, and
    the two-way valve is open during an inactive state of the compressor unit such that a maximum pressure compensation between the bearing and the ambient can be achieved.

9. The bearing according to claim 1, wherein the ventilation device further comprises a pressure transducer for monitoring a pressure within the bearing.

10. A wind turbine for generating electricity, wherein a main bearing supporting the rotor of the wind turbine comprises a bearing according to claim 1.

11. The wind turbine according to claim 10, wherein the bearing comprises a stationary inner bearing ring and a rotating outer bearing ring, and
    the at least one pressure compensation hole is located in a bottom part of the inner bearing ring.

12. A method of reducing leakage of lubricant out of a bearing of a wind turbine, wherein the method comprises the steps of:
    selectively blowing a compressed medium through a pressure compensation hole of the bearing to remove an amount of lubricant obstructing the at least one pressure compensation hole for ensuring that the pressure compensation hole remains substantially unobstructed; and
    minimizing overpressure within the bearing compared to the ambient by enabling a pressure compensation between the bearing and the ambient via the pressure compensation hole, wherein air inside the bearing exits through the unobstructed pressure compensation hole to minimize overpressure.

13. The method according to claim 12, further comprising:
deliberately building up overpressure within the bearing by means of a compressor unit such that discharge of used lubricant from inside the bearing into the ambient via at least one lubricant drain hole is facilitated.

\* \* \* \* \*